(12) United States Patent
Kim et al.

(10) Patent No.: US 10,066,063 B2
(45) Date of Patent: Sep. 4, 2018

(54) METHOD FOR PREPARING SUPERABSORBENT RESIN AND SUPERABSORBENT RESIN PREPARED THEREBY

(71) Applicant: LG Chem, Ltd., Seoul (KR)

(72) Inventors: Young Sam Kim, Daejeon (KR); Min-Seok Jang, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/502,686

(22) PCT Filed: Apr. 20, 2016

(86) PCT No.: PCT/KR2016/004096
§ 371 (c)(1),
(2) Date: Feb. 8, 2017

(87) PCT Pub. No.: WO2017/010660
PCT Pub. Date: Jan. 19, 2017

(65) Prior Publication Data
US 2017/0233534 A1     Aug. 17, 2017

(30) Foreign Application Priority Data

Jul. 10, 2015   (KR) .................. 10-2015-0098351

(51) Int. Cl.
*C08J 3/12*   (2006.01)
*C08K 3/36*   (2006.01)
(Continued)

(52) U.S. Cl.
CPC ............... *C08J 3/12* (2013.01); *C08J 3/075* (2013.01); *C08J 3/203* (2013.01); *C08J 3/245* (2013.01);
(Continued)

(58) Field of Classification Search
None
See application file for complete search history.

(56) References Cited

U.S. PATENT DOCUMENTS 9,555,393 B2 *   1/2017   Lee ................... B01J 20/28026
9,700,871 B2 *   7/2017   Lee ................... B01J 20/3021
(Continued)

FOREIGN PATENT DOCUMENTS

KR   20140063457 A   5/2014
KR   20140145810 A   12/2014
(Continued)

OTHER PUBLICATIONS

International Search Report from PCT/KR2016/004096, dated Jul. 29, 2016.
(Continued)

*Primary Examiner* — Vu A Nguyen
(74) *Attorney, Agent, or Firm* — Lerner, David, Littenberg, Krumholz & Mentlik, LLP

(57) ABSTRACT

Disclosed is a method of preparing a superabsorbent polymer, including a) drying and pulverizing a hydrogel polymer, and then classifying into a first fine powder having a particle size of less than 150 µm and a base polymer having a particle size of 150 to 850 µm; b) mixing a portion of the first fine powder, water and an additive, thus preparing a first fine-powder regranulate; c) passing the first fine-powder regranulate through a chopper and then performing drying and pulverizing; and d) classifying the pulverized first fine-powder regranulate into a superabsorbent polymer having a particle size of 150 to 850 µm and a second fine powder having a particle size of less than 150 µm, thus yielding the superabsorbent polymer.

20 Claims, 3 Drawing Sheets

1:1 Ratio

(51) Int. Cl.
*C08J 3/075* (2006.01)
*C08K 3/04* (2006.01)
*C08K 3/22* (2006.01)
*C08J 3/20* (2006.01)
*C08J 3/24* (2006.01)

(52) U.S. Cl.
CPC .................. *C08K 3/04* (2013.01); *C08K 3/22* (2013.01); *C08K 3/36* (2013.01); *C08J 2333/02* (2013.01); *C08K 2003/2241* (2013.01)

(56) References Cited

U.S. PATENT DOCUMENTS

| | | |
|---|---|---|
| 2004/0249120 A1* | 12/2004 | Nagasawa .................. C08J 3/12 528/499 |
| 2013/0102750 A1 | 4/2013 | Watanabe et al. |
| 2014/0371400 A1 | 12/2014 | Tachi et al. |
| 2015/0259522 A1 | 9/2015 | Lee et al. |
| 2016/0045895 A1 | 2/2016 | Won et al. |

FOREIGN PATENT DOCUMENTS

| | | |
|---|---|---|
| KR | 101507287 B1 | 3/2015 |
| KR | 20150032045 A | 3/2015 |
| KR | 20150061270 A | 6/2015 |
| KR | 20150068321 A | 6/2015 |

OTHER PUBLICATIONS

Graham, A. T. et al., "Modern Superabsorbent Polymer Technology," Chapter 3: Commercial Processes for the Manufacture of Superabsorbent Polymers, Jan. 1, 1998, Wiley-VCH, New York, pp. V-VII, 69-103, XP003036145, ISBN: 978-0-471-19411-8.

Extended European Search Report including Written Opinion for EP16822879 dated May 29, 2018.

* cited by examiner

1:1 Ratio

1:1.5 Ratio

1:1 Ratio

1:1.5 Ratio

METHOD FOR PREPARING SUPERABSORBENT RESIN AND SUPERABSORBENT RESIN PREPARED THEREBY

CROSS-REFERENCE TO RELATED APPLICATIONS

The present application is a national phase entry under 35 U.S.C. § 371 of International Application No. PCT/KR2016/004096, filed Apr. 20, 2016, which claims priority to and the benefit of Korean Patent Application No. 10-2015-0098351, filed Jul. 10, 2015, all of which are hereby incorporated by reference in their entirety into this application.

TECHNICAL FIELD

The present invention relates to a method of preparing a superabsorbent polymer and a superabsorbent polymer prepared thereby.

BACKGROUND ART

Superabsorbent polymers (SAPs, or superabsorbent resins) are synthetic polymer materials that are able to absorb about 500 to 1000 times their own weight in moisture. Such superabsorbent polymers have begun to be used in real-world applications for sanitary items, and are currently being widely utilized not only in hygiene products, such as disposable baby diapers and the like, but also in soil conditioners for gardening applications, water stopping agents for civil engineering and construction applications, sheets for raising seedlings, freshness preservatives for food distribution, fomentation materials, etc.

Such a superabsorbent polymer may be prepared through reverse-phase suspension polymerization or aqueous polymerization. A hydrogel polymer obtained through a polymerization reaction is typically dried and then pulverized, and the powdered product thereof is commercially available. As such, in the process of pulverizing the dried polymer, fine powder having a particle size of about 150 μm or less, falling out of the normal particle size range, is generated. This fine powder cannot be sold as a normal product. When superabsorbent polymer particles containing such fine powder are applied to products, they may move before use or may exhibit deteriorated properties.

Hence, this fine powder is excluded from the final polymer product or is subjected to a regranulation process for agglomerating fines so as to fall within the normal particle size range. As such, the regranulated fine-powder has to possess high agglomeration strength so as not to deagglomerate again. Typically, in order to increase agglomeration strength, a regranulation process is performed in a wet state. In this regard, Korean Patent Application Publication No. 2014-0063457 discloses a method of preparing a superabsorbent polymer, which includes forming a fine-powder regranulate using only fine powder and water, without the use of additives.

DISCLOSURE

Technical Problem

An object of the present invention is to provide a method of preparing a superabsorbent polymer and a superabsorbent polymer prepared thereby, wherein a fine-powder regranulate having improved properties may be prepared by selecting the ratio of water and fine powder and by adding an additive, and may be efficiently recycled to thus reduce processing costs, and the properties and efficiency of conventional production processes may be maintained using only the fine-powder regranulate.

Technical Solution

In order to accomplish the above object, the present invention provides a method of preparing a superabsorbent polymer, comprising: a) drying and pulverizing a hydrogel polymer, and then classifying into a first fine powder having a particle size of less than 150 μm and a base polymer having a particle size of 150 to 850 μm; b) mixing a portion of the first fine powder, water and an additive, thus preparing a first fine-powder regranulate; c) passing the first fine-powder regranulate through a chopper and then performing drying and pulverizing; and d) classifying the pulverized first fine-powder regranulate into a superabsorbent polymer having a particle size of 150 to 850 μm and a second fine powder having a particle size of less than 150 μm, thus yielding the superabsorbent polymer.

In addition, the present invention provides a method of preparing a superabsorbent polymer, comprising: a) drying and pulverizing a hydrogel polymer, and then classifying into a first fine powder having a particle size of less than 150 μm and a base polymer having a particle size of 150 to 850 μm; b) mixing a portion of the first fine powder and water, thus preparing a first fine-powder regranulate; c) passing the first fine-powder regranulate through a chopper and then performing drying and pulverizing; d) classifying the pulverized first fine-powder regranulate into a second fine powder having a particle size of less than 150 μm; e) mixing a portion of the first fine powder, a portion of the second fine powder, water, and an additive, thus preparing a second fine-powder regranulate; f) passing the second fine-powder regranulate through a chopper and then performing drying and pulverizing; and g) classifying the pulverized second fine-powder regranulate, thus yielding a superabsorbent polymer having a particle size of 150 to 850 μm.

In addition, the present invention provides a superabsorbent polymer prepared by the above method.

Advantageous Effects

According to the present invention, a method of preparing a superabsorbent polymer enables fine powder to be recycled while maintaining the properties of conventional superabsorbent polymers and the production efficiency thereof, thus reducing the cost of preparing the superabsorbent polymer, thereby generating economic benefits.

BEST MODE

Figure 1:
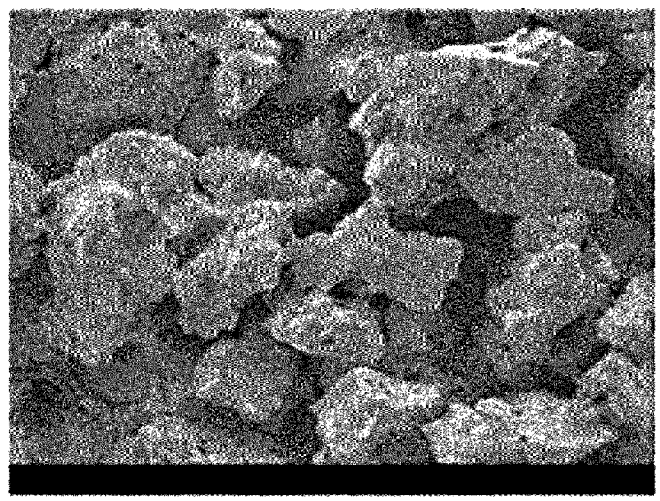
FIG. 1 is a scanning electron microscopy (SEM) image illustrating a fine-powder regranulate of Preliminary Comparative Example 1.

The present invention addresses a method of preparing a superabsorbent polymer and a superabsorbent polymer prepared thereby. In the method of preparing the superabsorbent polymer according to the present invention, fine powder may be recycled, thus reducing processing costs, thereby generating economic benefits. Furthermore, an additive is used during the formation of a fine-powder regranulate, yielding a superabsorbent polymer produced from only the fine-powder regranulate.

Hereinafter, a detailed description will be given of the present invention.

According to the present invention, the method of preparing a superabsorbent polymer includes: a) drying and pulverizing a hydrogel polymer, and then classifying into a first fine powder having a particle size of less than 150 µm and a base polymer having a particle size of 150 to 850 µm; b) mixing a portion of the first fine powder, water and an additive, thus preparing a first fine-powder regranulate; c) passing the first fine-powder regranulate through a chopper and then performing drying and pulverizing; and d) classifying the pulverized first fine-powder regranulate into a superabsorbent polymer having a particle size of 150 to 850 µm and a second fine powder having a particle size of less than 150 µm, thus yielding the superabsorbent polymer.

In addition, the method of preparing a superabsorbent polymer according to the present invention includes: a) drying and pulverizing a hydrogel polymer, and then classifying into a first fine powder having a particle size of less than 150 µm and a base polymer having a particle size of 150 to 850 µm; b) mixing a portion of the first fine powder and water, thus preparing a first fine-powder regranulate; c) passing the first fine-powder regranulate through a chopper and then performing drying and pulverizing; d) classifying the pulverized first fine-powder regranulate into a second fine powder having a particle size of less than 150 µm; e) mixing a portion of the first fine powder, a portion of the second fine powder, water, and an additive, thus preparing a second fine-powder regranulate; f) passing the second fine-powder regranulate through a chopper and then performing drying and pulverizing; and g) classifying the pulverized second fine-powder regranulate, thus yielding a superabsorbent polymer having a particle size of 150 to 850 µm.

To obtain the superabsorbent polymer according to the present invention, a hydrogel polymer may be prepared through steps and methods typically used in the art. Specifically, in the preparation of the superabsorbent polymer according to the present invention, the hydrogel polymer may be prepared by polymerizing a monomer composition comprising a water-soluble ethylenic unsaturated monomer and a polymerization initiator.

For the polymerization initiator included in the monomer composition, depending on the polymerization method, a photopolymerization initiator may be used upon photopolymerization, and a thermal polymerization initiator may be employed upon thermal polymerization. Even when photopolymerization is conducted, a predetermined amount of heat is generated due to irradiation with UV light, and also due to polymerization, which is an exothermic reaction, and thus a thermal polymerization initiator may be additionally included.

In the method of preparing the superabsorbent polymer according to the present invention, the thermal polymerization initiator is not particularly limited, but preferably includes at least one selected from the group consisting of a persulfate-based initiator, an azo-based initiator, hydrogen peroxide, and ascorbic acid. In particular, examples of the persulfate-based initiator may include sodium persulfate ($Na_2S_2O_8$), potassium persulfate ($K_2S_2O_8$), and ammonium persulfate (($NH_4)_2S_2O_8$); and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, and 4,4-azobis-(4-cyanovaleric acid).

In the method of preparing the superabsorbent polymer according to the present invention, the photopolymerization initiator is not particularly limited, but preferably includes at least one selected from the group consisting of benzoin ether, dialkyl acetophenone, hydroxyl alkylketone, phenyl glyoxylate, benzyl dimethyl ketal, acyl phosphine, and α-aminoketone. A specific example of the acyl phosphine may include commercially available Lucirin TPO, that is, 2,4,6-trimethyl-benzoyl-trimethyl phosphine oxide.

In the method of preparing the superabsorbent polymer according to the present invention, the water-soluble ethylenic unsaturated monomer is not particularly limited, so long as it is a monomer typically used to synthesize a superabsorbent polymer, and preferably includes any one or more selected from the group consisting of an anionic monomer and salts thereof, a nonionic hydrophilic monomer, and an amino group-containing unsaturated monomer and quaternary salts thereof. Specifically useful is at least one selected from the group consisting of anionic monomers and salts thereof, such as acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; nonionic hydrophilic monomers such as (meth)acrylamide, N-substituted (meth)acrylate, 2-hydroxyethyl(meth)acrylate, 2-hydroxypropyl(meth)acrylate, methoxypolyethyleneglycol (meth)acrylate, and polyethyleneglycol (meth)acrylate; and amino group-containing unsaturated monomers and quaternary salts thereof such as (N,N)-dimethylaminoethyl (meth)acrylate and (N,N)-dimethylaminopropyl (meth)acrylamide. More preferably, acrylic acid or salts thereof are used. When acrylic acid or salts thereof are used as the monomer, a superabsorbent polymer having improved absorbability may be advantageously obtained.

In the method of preparing the superabsorbent polymer according to the present invention, the concentration of the water-soluble ethylenic unsaturated monomer of the monomer composition may be appropriately determined in consideration of the polymerization time and the reaction conditions, and is preferably set to 40 to 55 wt %. If the concentration of the water-soluble ethylenic unsaturated monomer is less than 40 wt %, economic benefits are negated. On the other hand, if the concentration thereof exceeds 55 wt %, the pulverizing efficiency of the hydrogel polymer may decrease.

Whether the hydrogel polymer is prepared from the monomer composition using thermal polymerization or photopolymerization is not limited, so long as it is typically useful. Specifically, polymerization methods are largely classified into thermal polymerization and photopolymerization, depending on the source of energy used for polymerization. Typically, thermal polymerization is conducted using a reactor having a stirring shaft, such as a kneader, and photopolymerization is implemented using a reactor having a movable conveyor belt. However, the above polymerization methods are merely illustrative, and the present invention is not limited to those polymerization methods.

For example, hot air is fed to a reactor with a stirring shaft, such as a kneader, or the reactor is heated, so that thermal polymerization is carried out, yielding a hydrogel polymer, which is then discharged at a size ranging from ones of mm to ones of cm through the outlet of the reactor, depending on the shape of the stirring shaft of the reactor. Specifically, the size of the hydrogel polymer may vary depending on the concentration of the supplied monomer composition and the supply rate thereof, and typically a hydrogel polymer having a particle size of 2 to 50 mm may be obtained.

Also, when photopolymerization is carried out using a reactor having a movable conveyor belt, a hydrogel polymer in sheet form having the same width as the belt may result. As such, the thickness of the polymer sheet may vary depending on the concentration of the supplied monomer composition and the supply rate thereof, but the monomer composition is preferably supplied so as to form a polymer sheet having a thickness of 0.5 to 5 cm. In the case where the monomer composition is supplied to an extent that a very thin polymer sheet is formed, production efficiency may undesirably decrease. If the thickness of the polymer sheet is greater than 5 cm, polymerization may not be uniformly carried out throughout the sheet, which is too thick.

The hydrogel polymer thus obtained typically has a moisture content of 30 to 60 wt %. As used herein, the term "moisture content" refers to an amount of moisture based on the total weight of the hydrogel polymer, that is, a value obtained by subtracting the weight of the dried polymer from the weight of the hydrogel polymer. (Specifically, it is defined as a value calculated by measuring the weight lost from the polymer due to the evaporation of moisture while drying the polymer at a high temperature via IR heating. As such, the drying is performed in such a manner that the temperature is increased from room temperature to 180° C. and then maintained at 180° C., and the total drying time is set to 20 min, including 5 min necessary for increasing the temperature.)

The hydrogel polymer obtained through thermal polymerization or photopolymerization is dried, and the drying temperature is preferably set to 150 to 250° C. As used herein, the term "drying temperature" refers to the temperature of a heat medium supplied for the drying process or the temperature of a drying reactor containing a heat medium and a polymer in the drying process.

If the drying temperature is lower than 150° C., the drying time may become excessively long, and the properties of the final superabsorbent polymer may thus be deteriorated. On the other hand, if the drying temperature is higher than 250° C., only the surface of the polymer may be excessively dried, and thereby fine powder may be generated in the subsequent pulverizing process, and the properties of the final superabsorbent polymer may be deteriorated. The drying is preferably performed at a temperature of 150 to 250° C., and more preferably 160 to 200° C.

The drying time is not limited, but may be set to 20 to 90 min, taking processing efficiency into account.

Also, the drying process is not limited, so long as it is typically used to dry the hydrogel polymer. Specific examples thereof may include hot air supply, IR irradiation, microwave irradiation, and UV irradiation. After the drying process the polymer may have a moisture content of 0.1 to 10 wt %.

Meanwhile, the method of preparing the superabsorbent polymer according to the present invention may further include a simple pulverizing process before the drying process, as necessary, in order to increase the drying efficiency. The simple pulverizing process is conducted before the drying process so that the particle size of the hydrogel polymer falls in the range of 1 to 15 mm Pulverizing the particle size of the polymer to less than 1 mm is technically difficult due to the high moisture content of the hydrogel polymer, and the pulverized particles may agglomerate. On the other hand, if the polymer is pulverized to a particle size larger than 15 mm, the effect of increasing the drying efficiency via the pulverizing process may become insignificant.

In the simple pulverizing process that precedes the drying process, any pulverizer may be used without limitation. A specific example thereof may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

When the pulverizing process is performed to increase the drying efficiency before the drying process in this way, the polymer, which has high moisture content, may stick to the surface of the pulverizer. Thus, in order to increase the pulverizing efficiency of the hydrogel polymer before the drying process, an additive able to prevent stickiness may be further used upon pulverizing.

The specific kind of additive that may be found useful is not limited. Examples thereof may include, but are not limited to, a fine-powder agglomeration inhibitor, such as steam, water, a surfactant, and inorganic powder such as clay or silica; a thermal polymerization initiator, such as a persulfate-based initiator, an azo-based initiator, hydrogen peroxide, and ascorbic acid; and a crosslinking agent, such as an epoxy-based crosslinking agent, a diol-based crosslinking agent, a bifunctional or trifunctional or higher polyfunctional acrylate, and a monofunctional compound having a hydroxyl group.

After the drying process, the dried hydrogel polymer is pulverized. The polymer resulting from such a pulverizing process has a particle size of 150 to 850 µm, and is referred to as a base polymer. The base polymer may be prepared into a superabsorbent polymer through drying, pulverizing, classifying, and surface crosslinking.

A pulverizer used to pulverize the hydrogel polymer into such a particle size may include, but is not limited to, a pin mill, a hammer mill, a screw mill, a roll mill, a disc mill, or a jog mill.

In the preparation method according to the present invention, the additive used to form the fine-powder regranulate may include at least one selected from the group consisting of sodium hydroxide (NaOH), sodium persulfate (SPS), and particles having i) a BET specific surface area of 300 to 1500 $m^2/g$ and ii) a porosity of 50% or more, and may further include polyethylene glycol diacrylate (PEGDA) or polyethylene glycol (PEG).

The particles are not limited so long as they have any one selected from among properties including i) a BET specific surface area of 300 to 1500 $m^2/g$, ii) a porosity of 50% or more, iii) a particle size ranging from 2 nm to 50 µm, and iv) superhydrophobicity with a water contact angle of 125° or more.

Specific examples of the particles may include, but are not limited to, inorganic oxides, such as silica ($SiO_2$), alumina, titania ($TiO_2$), and carbon, inorganic compounds, organic polymers, ion exchange resins, metals, metal salts, etc., which may be used alone or in combination. Preferably useful is silica ($SiO_2$).

In the preparation of the first fine-powder regranulate according to another embodiment of the present invention, a portion of the first fine powder is preferably mixed in an amount greater than the weight of water.

In the preparation of the second fine-powder regranulate according to still another embodiment of the present invention, the weight of the mixture comprising a portion of the first fine powder and a portion of the second fine powder may be equal to or greater than the weight of water. Preferably, the ratio of the weight of the mixture comprising a portion of the first fine powder and a portion of the second fine powder to the weight of water may range from 1:1 to 1:3.

This is because the granulation state of the fine-powder regranulate becomes good when the weight of water is greater than the weight of the fine powder upon preparation of the fine-powder regranulate.

The method of preparing the superabsorbent polymer according to the present invention may further include surface crosslinking the superabsorbent polymer using a surface crosslinking agent.

The surface crosslinking agent may include any one or more selected from the group consisting of water; an alcohol compound; an epoxy compound; a polyamine compound; a haloepoxy compound; a haloepoxy compound condensed product; an oxazoline compound; a mono-, di- or poly-oxazolidinone compound; a cyclic urea compound; a multivalent metal salt; particles having i) a BET specific surface area of 300 to 1500 $m^2/g$ and ii) a porosity of 50% or more; an organic carboxylic acid compound; and an alkylene carbonate compound. Preferably useful is at least one selected from the group consisting of water, methanol, particles, and oxalic acid.

The particles are not limited so long as they have any one selected from among properties including i) a BET specific surface area of 300 to 1500 $m^2/g$, ii) a porosity of 50% or more, iii) a particle size ranging from 2 nm to 50 μm, and iv) superhydrophobicity with a water contact angle of 125° or more.

Specifically, the particles preferably include at least one selected from the group consisting of silica ($SiO_2$), alumina, carbon, and titania ($TiO_2$). Most preferably useful is silica ($SiO_2$).

Specifically, the alcohol compound may include at least one selected from the group consisting of methanol, ethanol, propanol, mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

Examples of the epoxy compound may include ethylene glycol diglycidyl ether and glycidol, and the polyamine compound may include at least one selected from the group consisting of ethylene diamine, diethylene triamine, triethylene tetramine, tetraethylene pentamine, pentaethylene hexamine, polyethyleneimine, and polyamide polyamine.

Examples of the haloepoxy compound may include epichlorohydrin, epibromohydrin, and α-methyl epichlorohydrin. The mono-, di- or poly-oxazolidinone compound may be exemplified by 2-oxazolidinone. The alkylene carbonate compound may include ethylene carbonate. These compounds may be used alone or in combination. To increase the efficiency of the surface crosslinking process, the surface crosslinking agent preferably includes, but is not limited to, at least one alcohol compound.

In an embodiment of the present invention, the amount of the surface crosslinking agent added to treat the surface of the polymer particles may be appropriately determined depending on the kind of surface crosslinking agent or the reaction conditions, and is set to 0.001 to 5 parts by weight, preferably 0.01 to 3 parts by weight, and more preferably 0.05 to 2 parts by weight, based on 100 parts by weight of the polymer.

If the amount of the surface crosslinking agent is too small, the surface crosslinking reaction does not readily occur. On the other hand, if the amount thereof exceeds 5 parts by weight based on 100 parts by weight of the polymer, the properties of the superabsorbent polymer may deteriorate due to excessive surface crosslinking reactions.

Here, the method whereby the surface crosslinking agent is added to the polymer is not limited. Specifically, the surface crosslinking agent and the polymer powder may be placed in a reaction bath and mixed, the surface crosslinking agent may be sprayed onto the polymer powder, or the polymer and the crosslinking agent may be continuously supplied and mixed using a reaction bath, such as a mixer that operates continuously.

The temperature of the polymer itself may be 20 to 90° C. when the surface crosslinking agent is added, so that the temperature is increased to the reaction temperature within 1 to 60 min to perform surface crosslinking in the presence of the surface crosslinking agent. To realize the above temperature of the polymer itself, processes after the drying process, which is carried out at a relatively high temperature, are continuously performed, and the processing time may be shortened. Alternatively, the polymer may be heated separately when it is difficult to shorten the processing time.

In the method of preparing the superabsorbent polymer according to the present invention, the surface crosslinking agent added to the polymer may be heated, so that the temperature is increased to the reaction temperature within 1 to 60 min to perform surface crosslinking in the presence of the surface crosslinking agent.

In another embodiment of the present invention, when the surface crosslinking agent is added, the surface temperature of the polymer preferably falls in the range of 60 to 90° C., and the temperature of the surface crosslinking agent preferably falls in the range of 5 to 40° C., but the present invention is not limited thereto.

More specifically, in the method of preparing the superabsorbent polymer according to the present invention, when the surface crosslinking reaction is carried out after the temperature is increased to the reaction temperature within 1 to 60 min so as to prepare for surface crosslinking, the efficiency of the surface crosslinking process may be increased. Ultimately, the residual monomer content of the final superabsorbent polymer may be minimized, and a superabsorbent polymer having superior properties may be attained. As such, the temperature of the added surface crosslinking agent is adjusted within the range from 5 to 60° C., and preferably 10 to 40° C. If the temperature of the surface crosslinking agent is lower than 5° C., the heating rate reduction effect may become insignificant in terms of realizing the surface crosslinking reaction via heating using the surface crosslinking agent. On the other hand, if the temperature of the surface crosslinking agent is higher than 60° C., the surface crosslinking agent may not be uniformly dispersed in the polymer. As used herein, the surface crosslinking reaction temperature may be defined as the combined temperature of the polymer and the surface crosslinking agent that is added for the crosslinking reaction.

The heating member for the surface crosslinking reaction is not limited. Specifically, a heat medium may be supplied, or direct heating may be conducted using electricity, but the present invention is not limited thereto. Specific examples of the heat source may include steam, electricity, UV light, and IR light. Additionally, a heated thermal fluid may be used.

In the method of preparing the superabsorbent polymer according to the present invention, after heating for the crosslinking reaction, the crosslinking reaction is carried out for 1 to 120 min, preferably 5 to 40 min, and more preferably 10 to 20 min. If the crosslinking reaction time is shorter than 1 min, the crosslinking reaction may not sufficiently occur. On the other hand, if the crosslinking reaction time is longer than 60 min, the properties of the superabsorbent polymer may deteriorate due to the excessive surface crosslinking reaction, and attrition of the polymer may occur due to long-term residence in the reactor.

Also, the superabsorbent polymer produced by reacting the hydrogel polymer with the surface crosslinking agent may be further pulverized. The particle size of the superabsorbent polymer thus pulverized ranges from 150 to 850 μm. Specific examples of a pulverizer used to obtain such a particle size may include, but are not limited to, a pin mill, a hammer mill, a screw mill, a roll mill, a disc mill, and a jog mill.

In addition, the present invention addresses a superabsorbent polymer prepared by the aforementioned method.

MODE FOR INVENTION

A better understanding of the present invention may be obtained via the following examples, which are set forth to illustrate, but are not to be construed as limiting the scope of the present invention. The scope of the present invention is given by the claims, and also contains all modifications within the meaning and range equivalent to the claims. Unless otherwise mentioned, "%" and "part", indicating amounts in the following examples and comparative examples, are given on a mass basis.

EXAMPLES

Preparation Examples

[Preparation Example 1] Preparation of Base Polymer and First Fine Powder 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture.

The monomer mixture was then placed on a continuously moving conveyor belt and irradiated with UV light (at 2 mW/cm$^2$) so that UV polymerization was carried out for 2 min, thus obtaining a hydrogel polymer.

The hydrogel polymer thus obtained was cut to a size of 5×5 mm, dried in a hot air oven at 170° C. for 2 hr, pulverized using a pin mill, and then classified using a standard sieve based on ASTM standards, thereby obtaining a base polymer having a particle size of 150 to 850 μm and a first fine powder having a particle size of less than 150 μm.

[Preparation Example 2] Preparation of Second Fine Powder 1000 g of the first fine powder obtained in Preparation Example 1 was placed in a fine-powder granulator and then granulated for 1 min by spraying 1500 g of water and 100 g of an additive solution comprising 3 wt % of sodium hydroxide (NaOH), 1500 ppm of sodium persulfate (SPS), and 1000 ppm of silica aerogel (AeroZel™, made by JIOS), resulting in a regranulate, which was then passed through a chopper, thereby yielding a first fine-powder regranulate. This first fine-powder regranulate was cut to a size of 5×5 mm, dried in a hot air oven at 170° C. for 2 hr, and pulverized using a pin mill.

The pulverized fine-powder regranulate was classified using a standard sieve based on ASTM standards, thereby obtaining a superabsorbent polymer having a particle size of 150 to 850 μm and a second fine powder having a particle size of less than 150 μm.

Examples

[Preliminary Example 1] Preparation of First Fine-Powder Regranulate

In order to evaluate the granulation strength of the fine-powder regranulate depending on the weight ratio of fine powder particles and water and depending on whether the regranulate was passed through the chopper, the fine powder particles obtained in Preparation Example 1 and water were used at a weight ratio of 1:1.5, and the fine powder was placed in a fine-powder granulator and then granulated for 1 min in a water spraying manner, thus obtaining a regranulate, which was then passed through a chopper, yielding a first fine-powder regranulate.

[Example 1] Preparation of Superabsorbent Polymer (1) Preparation of First Fine-Powder Regranulate 1000 g of the first fine powder obtained in Preparation Example 1 was placed in a fine-powder granulator and then granulated for 1 min by spraying 1500 g of water and 100 g of an additive solution comprising 3 wt % of sodium hydroxide (NaOH), 1500 ppm of sodium persulfate (SPS), and 1000 ppm of silica aerogel (AeroZel™, made by JIOS), resulting in a regranulate, which was then passed through a chopper, thereby yielding a first fine-powder regranulate.

(2) Preparation of Superabsorbent Polymer

The first fine-powder regranulate was dried to thus afford a fine-powder regranulate in a powder phase. Thereafter, 100 g of the fine-powder regranulate was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and then allowed to react while drying in a hot air oven. The dried powder was classified using a standard sieve based on ASTM standards, yielding a final superabsorbent polymer having a particle size of 150 to 850 μm.

Example 2

A fine-powder regranulate was prepared in the same manner as in Example 1, with the exception that the additive solution comprising 5 wt % of sodium hydroxide (NaOH), 1500 ppm of sodium persulfate (SPS), and 1000 ppm of silica aerogel (AeroZel™, made by JIOS) was used upon preparation of the first fine-powder regranulate.

Example 3

(1) Preparation of Second Fine-Powder Regranulate

The first fine powder obtained in Preparation Example 1 and the second fine powder obtained in Preparation Example 2 were mixed at a ratio of 8:2, after which 1000 g of the fine-powder mixture was placed in a fine-powder granulator, and then granulated for 1 min by spraying 1500 g of water and 100 g of an additive solution comprising 3 wt % of sodium hydroxide (NaOH), 1500 ppm of sodium persulfate (SPS), and 1000 ppm of silica aerogel (AeroZel™, made by JIOS), resulting in a regranulate, which was then passed through a chopper, thereby yielding a second fine-powder regranulate.

(2) Preparation of Superabsorbent Polymer 100 g of the second fine-powder regranulate was uniformly mixed with a mixture solution comprising 0.3 g of ethylene carbonate, 3.5 g of methanol, 3.0 g of water, 0.22 g of oxalic acid, and 0.01 g of silica aerogel (AeroZel™, made by JIOS), and then allowed to react while drying at 170° C. The reaction product was pulverized using a pin mill, and the pulverized fine-powder regranulate was classified using a standard sieve based on ASTM standards, yielding a final superabsorbent polymer having a particle size of 150 to 850 μm.

Example 4

A superabsorbent polymer was prepared in the same manner as in Example 3, with the exception that the ratio of the first fine powder to the second fine powder was set to 9:1 upon preparation of the second fine-powder regranulate.

Example 5

A superabsorbent polymer was prepared in the same manner as in Example 3, with the exception that the additive solution comprising 3 wt % of sodium hydroxide (NaOH), 1500 ppm of sodium persulfate (SPS), and 1000 ppm of silica aerogel (AeroZel™, made by JIOS) was further added with 3000 ppm of polyethylene glycol diacrylate (PEGDA) upon preparation of the second fine-powder regranulate.

Example 6

A superabsorbent polymer was prepared in the same manner as in Example 3, with the exception that the additive solution comprising 3 wt % of sodium hydroxide (NaOH), 1500 ppm of sodium persulfate (SPS), and 1000 ppm of silica aerogel (AeroZel™, made by JIOS) was further added with 2500 ppm of polyethylene glycol (PEG) upon preparation of the second fine-powder regranulate.

Comparative Examples

Preliminary Comparative Example 1

A first fine-powder regranulate was prepared in the same manner as in Preliminary Example 1, with the exception that the weight ratio of the first fine powder obtained in Preparation Example 1 to water was set to 1:1 and the resulting regranulate was not passed through a chopper.

Preliminary Comparative Example 2

A first fine-powder regranulate was prepared in the same manner as in Preliminary Example 1, with the exception that the resulting regranulate was not passed through a chopper.

Preliminary Comparative Example 3

A first fine-powder regranulate was prepared in the same manner as in Preliminary Comparative Example 1, with the exception that the resulting regranulate was passed through a chopper.

Comparative Example 1

A superabsorbent polymer was prepared in the same manner as in Example 1, with the exception that the additive solution was not used upon preparation of the first fine-powder regranulate.

Comparative Example 2

A superabsorbent polymer was prepared in the same manner as in Example 3, with the exception that the additive solution was not used upon preparation of the second fine-powder regranulate.

Comparative Example 3

A superabsorbent polymer was prepared in the same manner as in Example 4, with the exception that the additive solution was not used upon preparation of the second fine-powder regranulate.

TEST EXAMPLES: EVALUATION OF PROPERTIES

In order to evaluate the properties of the fine-powder regranulates of Preliminary Example and Preliminary Comparative Examples 1 to 3 and the superabsorbent polymers of Examples 1 to 6 and Comparative Examples 1 to 3, the following tests were performed.

[Test Example 1] Scanning Electron Microscopy (SEM)

Figure 2:
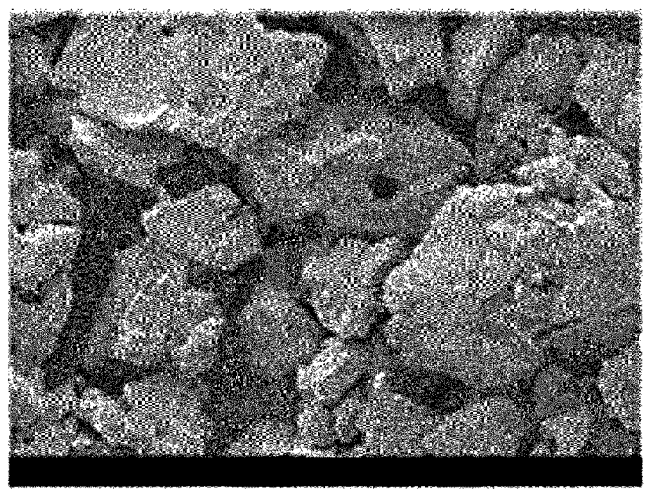
FIG. 2 is an SEM image illustrating a fine-powder regranulate of Preliminary Comparative Example 2.
Figure 3:
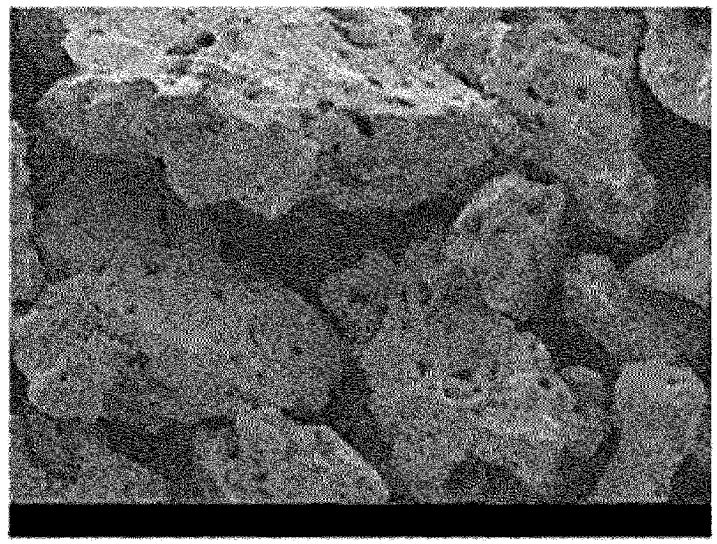
FIG. 3 is an SEM image illustrating a fine-powder regranulate of Preliminary Comparative Example 3.
Figure 4:
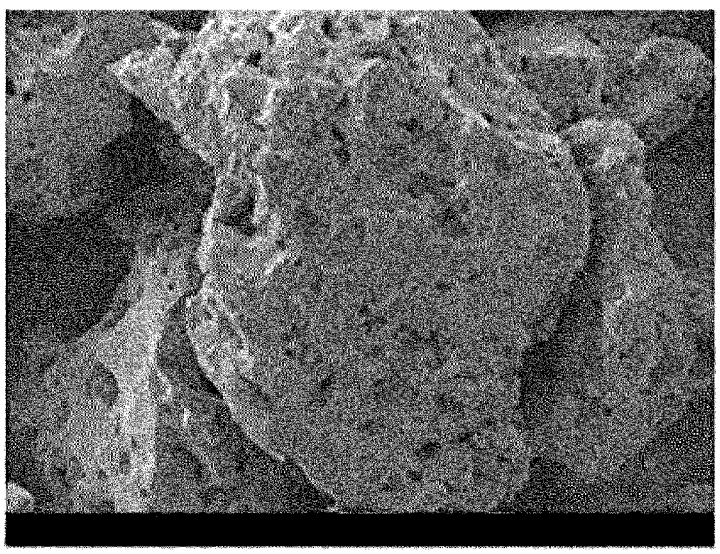
FIG. 4 is an SEM image illustrating a fine-powder regranulate of Preliminary Example 1.
Figure 5:
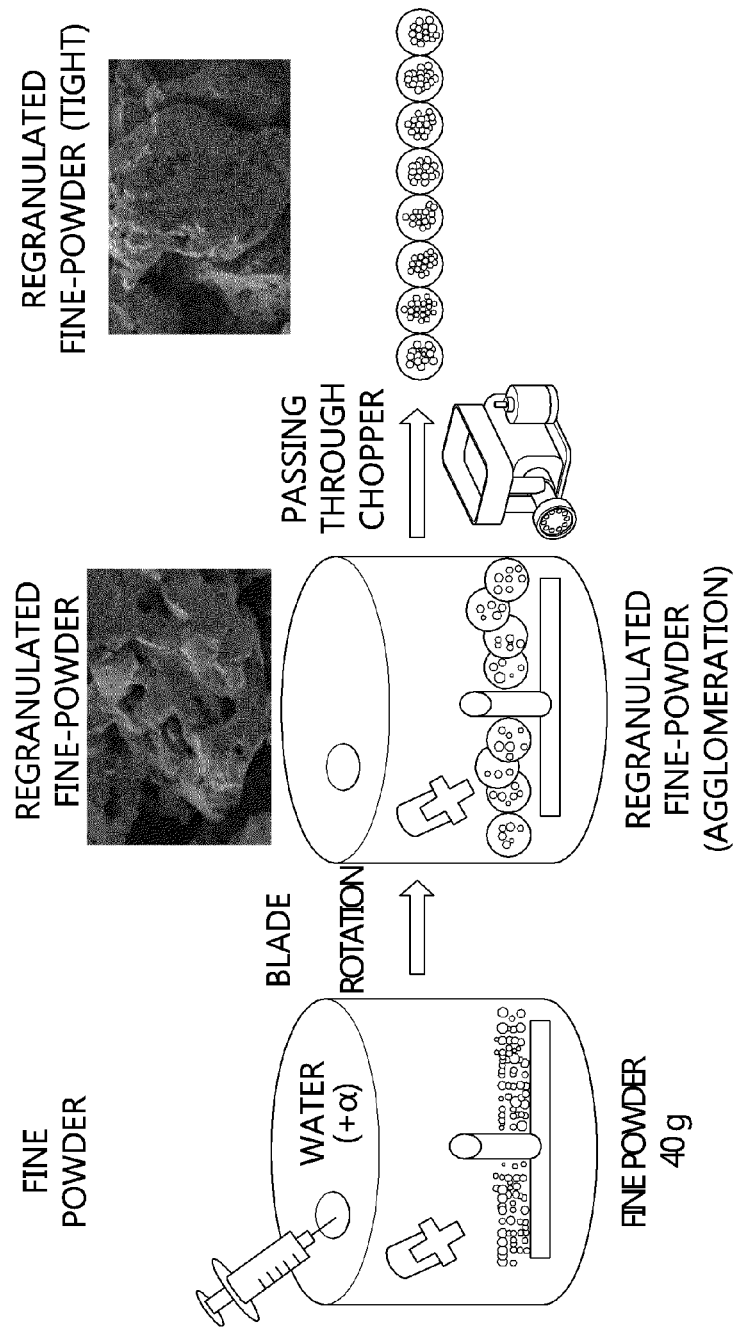
FIG. 5 schematically illustrates the experimental process for observing the granulation state of the fine-powder regranulates of Preliminary Comparative Examples 1 to 3 and Preliminary Example 1.

The granulation state of the fine-powder regranulates of Preliminary Example 1 and Preliminary Comparative Examples 1 to 3 was observed using SEM (the results of which are sequentially shown in FIGS. 1 to 4). As shown in the SEM images, the granulation state became better with an increase in the ratio of water. Furthermore, when the step of passing the regranulate through the chopper was performed, the granulation state was improved.

[Test Example 2] Centrifugal Retention Capacity (CRC)

The superabsorbent polymers of Examples 1 to 6 and Comparative Examples 1 to 3 were measured for CRC before and after surface crosslinking. CRC was measured using the EDANA method WSP 241.3. Specifically, 0.2 g of a sample of the prepared superabsorbent polymer, having a particle size of 300 to 600 μm, was placed in a teabag and then immersed in a 0.9% saline solution for 30 min. Thereafter, dehydration was performed for 3 min at a centrifugal force of 250 G (gravity), and the amount of saline solution that was absorbed was measured.

The results are shown in Tables 1 and 2 below.

[Test Example 3] Absorption Under Pressure (AUP)

The superabsorbent polymers of Examples 1 to 6 and Comparative Examples 1 to 3 were measured for AUP. AUP was measured using the EDANA method WSP 241.3. Specifically, 0.9 g of a sample of the prepared superabsorbent polymer, having a particle size of 300 to 600 µm, was placed in a cylinder according to EDANA, and a pressure of 0.7 psi was applied using a piston and a weight. Thereafter, the amount of 0.9% saline solution that was absorbed in 60 min was measured.

The results are shown in Tables 1 and 2 below.

[Test Example 4] Absorption Speed

The superabsorbent polymers of Examples 1 to 6 and Comparative Examples 1 to 3 were measured for absorption speed. 50 mL of a saline was placed in a 100 mL beaker together with a magnetic bar. The stirring rate was set to 600 rpm using a stirrer. While 2.0 g of the superabsorbent polymer was added to the saline, which was stirred, the period of time required until the vortex in the beaker disappeared was measured.

The results are shown in Tables 1 and 2 below.

[Test Example 5] Permeability

The superabsorbent polymers of Examples 1 to 6 and Comparative Examples 1 to 3 were measured for permeability.

In order to prevent the generation of bubbles between a cock and a glass filter in the lower portion of a chromatography column, about 10 mL of water was added in the opposite direction into the column, and the column was washed two or three times with saline and then filled with at least 40 mL of 0.9% saline. A piston was placed in the chromatography column, the lower valve was opened, and the period of time (B: sec) required for the liquid surface to move from 40 mL to 20 mL was recorded, thus completing blank testing. 0.2 g of a sample of the prepared superabsorbent polymer, having a particle size ranging from 300 to 600 µm, was placed in the column, and then saline was added such that the total amount of saline that resulted was 50 mL, after which the sample was allowed to stand for 30 min so that the superabsorbent polymer was sufficiently swollen. Thereafter, a piston (0.3 psi) having a weight was placed in the chromatography column and then allowed to stand for 1 min. The cock at the bottom of the chromatography column was opened, and the period of time (T1: sec) required for the liquid surface to move from 40 mL to 20 mL was recorded. The permeability was determined based on the following Equation 1.

Permeability=$T1-B$ [Equation 1]

The results are shown in Tables 1 and 2 below.

TABLE 1

| | CRC before surface cross-linking | CRC after surface cross-linking | AUP after surface cross-linking | Absorption speed after surface cross-linking | Permeability after surface cross-linking |
|---|---|---|---|---|---|
| C. Ex. 1 | 32.3 | 23.3 | 21.4 | 48 | 26 |
| Ex. 1 | 35.6 | 29.5 | 21.1 | 43 | 110 |
| Ex. 2 | 36.9 | 29.8 | 20.0 | 35 | 166 |

Table 1 shows changes in the properties of the first fine-powder regranulate depending on the addition of the additive. Based on the results of measurement of the properties of the fine-powder regranulate, CRC and AUP were increased due to the addition of sodium hydroxide (NaOH) and sodium persulfate (SPS), and also, a high absorption speed was exhibited.

TABLE 2

| | CRC before surface cross-linking | CRC after surface cross-linking | AUP after surface cross-linking | Absorption speed after surface cross-linking | Permeability after surface cross-linking |
|---|---|---|---|---|---|
| Ex. 1 | 20.1 | 15.9 | 17.1 | 54 | 5 |
| C. Ex. 2 | 25.8 | 20.9 | 19.2 | 74 | 11 |
| C. Ex. 3 | 27.3 | 23.5 | 21.2 | 60 | 23 |
| Ex. 3 | 31.1 | 28.7 | 19.5 | 42 | 107 |
| Ex. 4 | 32.3 | 30.2 | 18.5 | 37 | 235 |
| Ex. 5 | 32.2 | 28.4 | 20.5 | 43 | 61 |
| Ex. 6 | 33.2 | 28.6 | 20.6 | 47 | 150 |

Table 2 shows changes in the properties depending on the mixing of the first fine powder and the second fine powder and the addition of the additive upon preparation of the second fine-powder regranulate.

Based on the results of measurement of the properties of the fine-powder regranulate, as the amount of the second fine powder increased, CRC was decreased. Also, when the additive was added upon regranulation of the fine powder, the properties were improved.

The invention claimed is:
1. A method of preparing a superabsorbent polymer, comprising:
   a) drying and pulverizing a hydrogel polymer, and then classifying into a first fine powder having a particle size of less than 150 µm and a base polymer having a particle size of 150 to 850 µm;
   b) mixing a portion of the first fine powder, water and an additive, thus preparing a first fine-powder regranulate;
   c) passing the first fine-powder regranulate through a chopper and then performing drying and pulverizing; and
   d) classifying the pulverized first fine-powder regranulate into a superabsorbent polymer having a particle size of 150 to 850 µm and a second fine powder having a particle size of less than 150 µm, thus yielding the superabsorbent polymer,
   wherein the additive comprises particles having i) a BET specific surface area of 300 to 1500 $m^2/g$ and ii) a porosity of 50% or more.
2. A method of preparing a superabsorbent polymer, comprising:
   a) drying and pulverizing a hydrogel polymer, and then classifying into a first fine powder having a particle size of less than 150 µm and a base polymer having a particle size of 150 to 850 µm;
   b) mixing a portion of the first fine powder and water, thus preparing a first fine-powder regranulate;
   c) passing the first fine-powder regranulate through a chopper and then performing drying and pulverizing;
   d) classifying the pulverized first fine-powder regranulate into a second fine powder having a particle size of less than 150 µm;
   e) mixing a portion of the first fine powder, a portion of the second fine powder, water and an additive, thus preparing a second fine-powder regranulate;
   f) passing the second fine-powder regranulate through a chopper and then performing drying and pulverizing; and g) classifying the pulverized second fine-powder regranulate, thus yielding a superabsorbent polymer having a particle size of 150 to 850 μm,
wherein the additive comprises particles having i) a BET specific surface area of 300 to 1500 m$^2$/g and ii) a porosity of 50% or more.

3. The method of claim 2, wherein the base polymer is prepared into the superabsorbent polymer through drying, pulverizing, classifying, and surface crosslinking.

4. The method of claim 2, wherein the additive further comprises at least one selected from the group consisting of sodium hydroxide (NaOH) and sodium persulfate (SPS).

5. The method of claim 4, wherein the additive further comprises polyethylene glycol diacrylate (PEGDA) or polyethylene glycol (PEG).

6. The method of claim 2, wherein the particles comprise at least one selected from the group consisting of silica (SiO$_2$), alumina, carbon, and titania (TiO$_2$).

7. The method of claim 6, wherein the particles comprise silica (SiO$_2$).

8. The method of claim 2, wherein the particles have a particle size ranging from 2 nm to 50 μm.

9. The method of claim 2, wherein the particles have superhydrophobicity with a water contact angle of 125° or more.

10. The method of claim 1, wherein in the preparing the first fine-powder regranulate, the portion of the first fine powder is mixed in an amount greater than a weight of water.

11. The method of claim 2, wherein in the preparing the second fine-powder regranulate, a weight ratio of a mixture, comprising the portion of the first fine powder and the portion of the second fine powder, to water ranges from 1:1 to 1:3.

12. The method of claim 2, further comprising surface crosslinking the superabsorbent polymer using a surface crosslinking agent.

13. The method of claim 12, wherein the surface crosslinking agent comprises at least one selected from the group consisting of water; an alcohol compound; an epoxy compound; a polyamine compound; a haloepoxy compound; a haloepoxy compound condensed product; an oxazoline compound; a mono-, di- or poly-oxazolidinone compound; a cyclic urea compound; a multivalent metal salt; particles having i) a BET specific surface area of 300 to 1500 m$^2$/g and ii) a porosity of 50% or more; an organic carboxylic acid compound; and an alkylene carbonate compound.

14. The method of claim 13, wherein the surface crosslinking agent comprises at least one selected from the group consisting of ethylene carbonate, water, methanol, particles having i) a BET specific surface area of 300 to 1500 m$^2$/g and ii) a porosity of 50% or more, and oxalic acid.

15. The method of claim 12, wherein the surface crosslinking agent is added in an amount of 0.001 to 5 parts by weight based on 100 parts by weight of the superabsorbent polymer.

16. The method of claim 12, wherein the polymer has a surface temperature of 60 to 90° C. when the surface crosslinking agent is added.

17. The method of claim 12, wherein the surface crosslinking agent has a temperature of 5 to 40° C. when the surface crosslinking agent is added.

18. The method of claim 12, wherein the surface crosslinking is performed for 10 to 20 min.

19. The method of claim 12, wherein the surface crosslinking is performed through a heating process using at least one selected from a heat source group consisting of steam, electricity, UV light, and IR light.

20. The method of claim 13, wherein the particles comprise at least one selected from the group consisting of silica (SiO$_2$), alumina, carbon, and titania (TiO$_2$).

* * * * *